(12) United States Patent
Wilson et al.

(10) Patent No.: US 8,926,889 B2
(45) Date of Patent: Jan. 6, 2015

(54) APPARATUS AND METHOD FOR CURING A RUBBER LIKE ARTICLE

(75) Inventors: Brian D. Wilson, Greer, SC (US); Mark Creasap, Spartanburg, SC (US); Robert Gaut, Easley, SC (US); James Endicott, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 753 days.

(21) Appl. No.: 13/127,608

(22) PCT Filed: Nov. 21, 2008

(86) PCT No.: PCT/US2008/084351
§ 371 (c)(1),
(2), (4) Date: May 4, 2011

(87) PCT Pub. No.: WO2010/059162
PCT Pub. Date: May 27, 2010

(65) Prior Publication Data
US 2011/0209807 A1    Sep. 1, 2011

(51) Int. Cl.
*B29C 35/02*    (2006.01)
*B29C 37/00*    (2006.01)
*B29C 33/48*    (2006.01)
*B29C 35/16*    (2006.01)
*B29K 21/00*    (2006.01)
*B29L 30/00*    (2006.01)

(52) U.S. Cl.
CPC ............. *B29C 37/0003* (2013.01); *B29C 33/48* (2013.01); *B29C 35/02* (2013.01); *B29C 2035/1616* (2013.01); *B29C 2035/1658* (2013.01); *B29K 2021/00* (2013.01); *B29L 2030/00* (2013.01)
USPC ............................................. 264/501; 425/43

(58) Field of Classification Search
CPC ........................ B29D 30/0606; B29D 30/0605
USPC ............................................. 425/43; 264/501
See application file for complete search history.

(56) References Cited

U.S. PATENT DOCUMENTS 1,114,236 A    10/1914  Dees et al.
1,346,231 A     7/1920  Midgley, Sr. et al.
(Continued)

FOREIGN PATENT DOCUMENTS

EP    0893237 B1    1/1999
EP    0976533 B1    2/2000
(Continued)

OTHER PUBLICATIONS

International Search Report and Written Opinion for International Patent Application No. PCT/US2008/084351 with filing date of Nov. 21, 2008; dated Jan. 16, 2009.

(Continued)

*Primary Examiner* — Galen Hauth
(74) *Attorney, Agent, or Firm* — John Steckler Schwab

(57) ABSTRACT

Particular embodiments of the invention include methods and apparatus for molding and/or curing an article. Particular embodiments of such methods include positioning a mold core centrally within mold outer portion to form an annular mold cavity between the mold outer portion and the mold core, the core including an outer ring having an outer surface for engaging the annular article, the outer ring being formed of a material capable of expanding and contracting with changes in temperature. Such methods also include heating the mold outer ring, cooling the core outer ring subsequent to the step of heating, whereby the core outer ring contracts relative to the article and removing the article from the core outer ring.

32 Claims, 7 Drawing Sheets

(56) References Cited

U.S. PATENT DOCUMENTS

| | | |
|---|---|---|
| 1,824,717 A | 9/1931 | Harty et al. |
| 2,665,976 A | 1/1954 | Bean et al. |
| 2,677,854 A | 5/1954 | Andreini |
| 2,834,984 A * | 5/1958 | Robbins .......................... 425/24 |
| 3,002,228 A | 10/1961 | Salem et al. |
| 3,165,569 A | 1/1965 | Bright |
| 3,231,442 A | 1/1966 | Michael |
| 3,867,086 A | 2/1975 | Edwards |
| 3,963,393 A | 6/1976 | Barefoot |
| 4,699,578 A | 10/1987 | Sumner et al. |
| 4,782,580 A | 11/1988 | Cacioppo et al. |
| 4,867,822 A | 9/1989 | Bannink, Jr. |
| 4,895,692 A | 1/1990 | Laqurent et al. |
| 5,055,025 A | 10/1991 | Muller |
| 5,061,418 A | 10/1991 | Ware |
| 5,180,592 A | 1/1993 | Laurent |
| 5,204,042 A | 4/1993 | James et al. |
| 5,622,669 A | 4/1997 | Dailiez et al. |
| 5,631,030 A | 5/1997 | Brun, Jr. et al. |
| 5,817,259 A | 10/1998 | Pignata et al. |
| 5,851,557 A | 12/1998 | Pouille et al. |
| 6,547,553 B2 | 4/2003 | Koch et al. |

FOREIGN PATENT DOCUMENTS

| | | |
|---|---|---|
| EP | 1506852 A4 | 2/2005 |
| EP | 1749632 A4 | 2/2007 |
| EP | 1911571 B1 | 4/2008 |
| GB | 2140751 B | 12/1984 |

OTHER PUBLICATIONS

International Search Report and Written Opinion, dated Apr. 19, 2013.

* cited by examiner

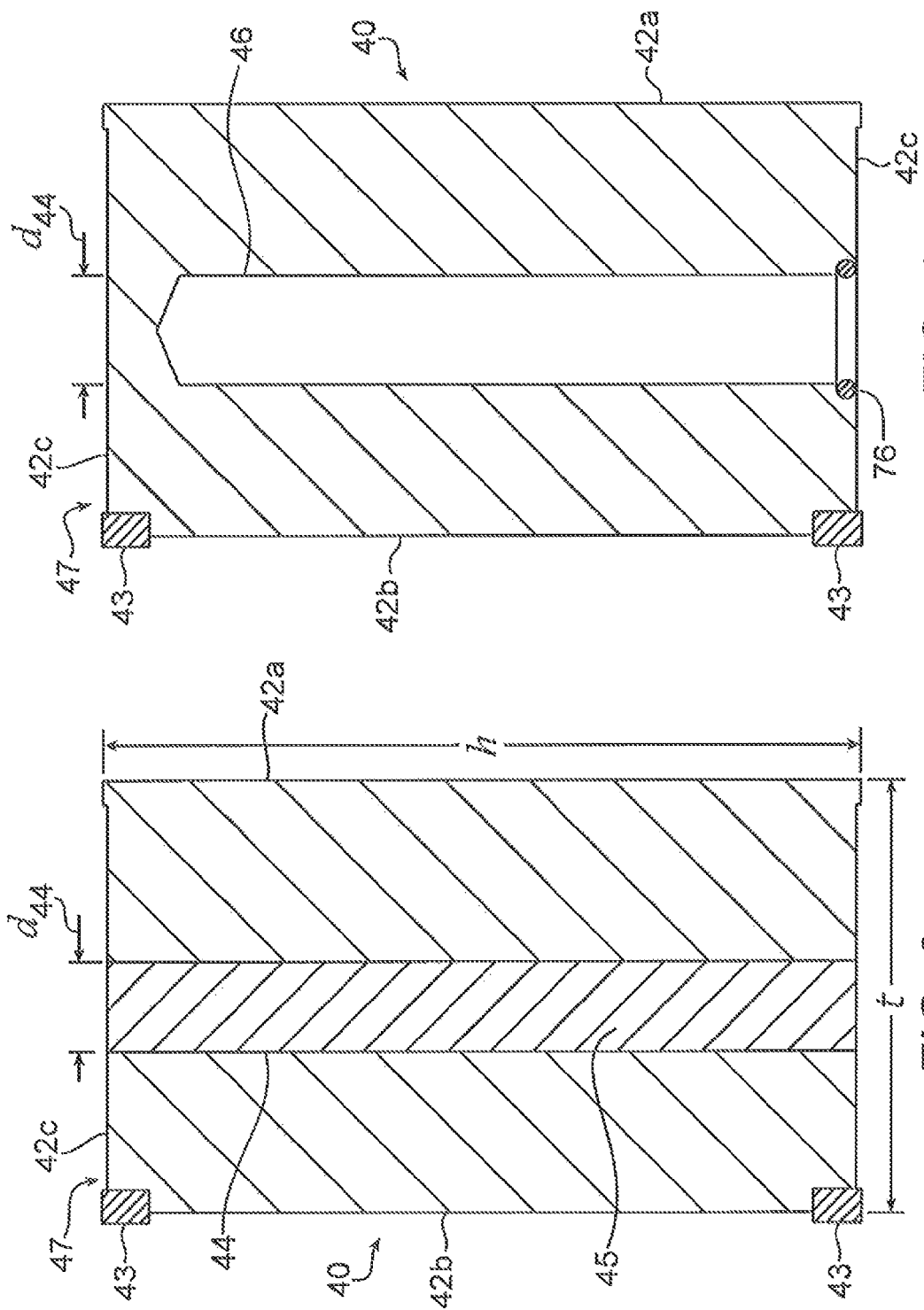

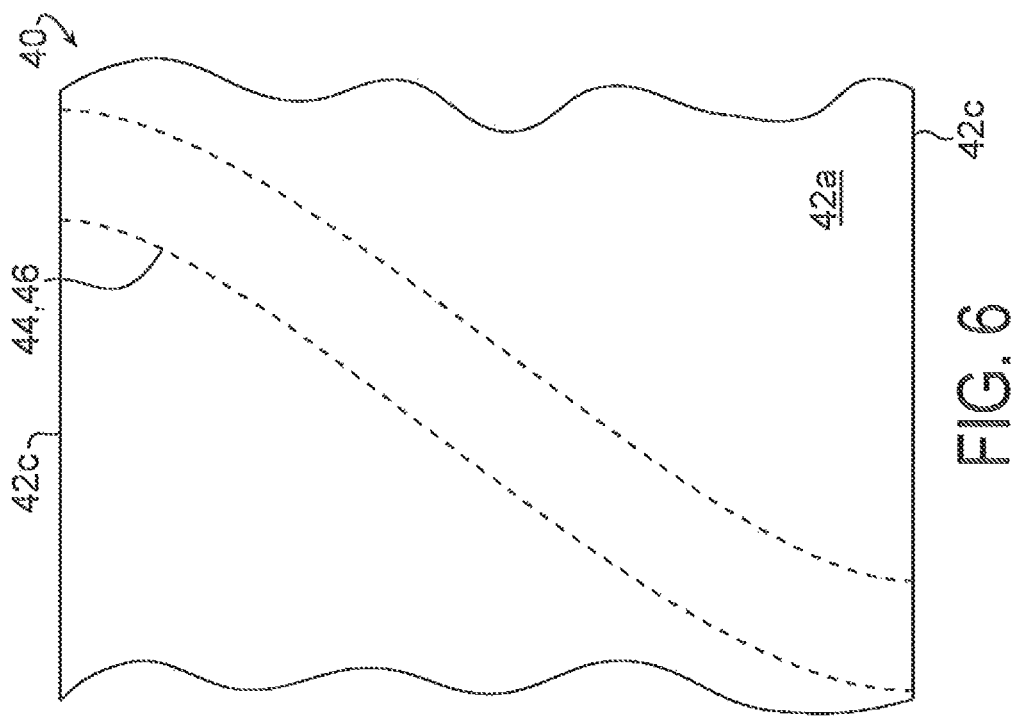
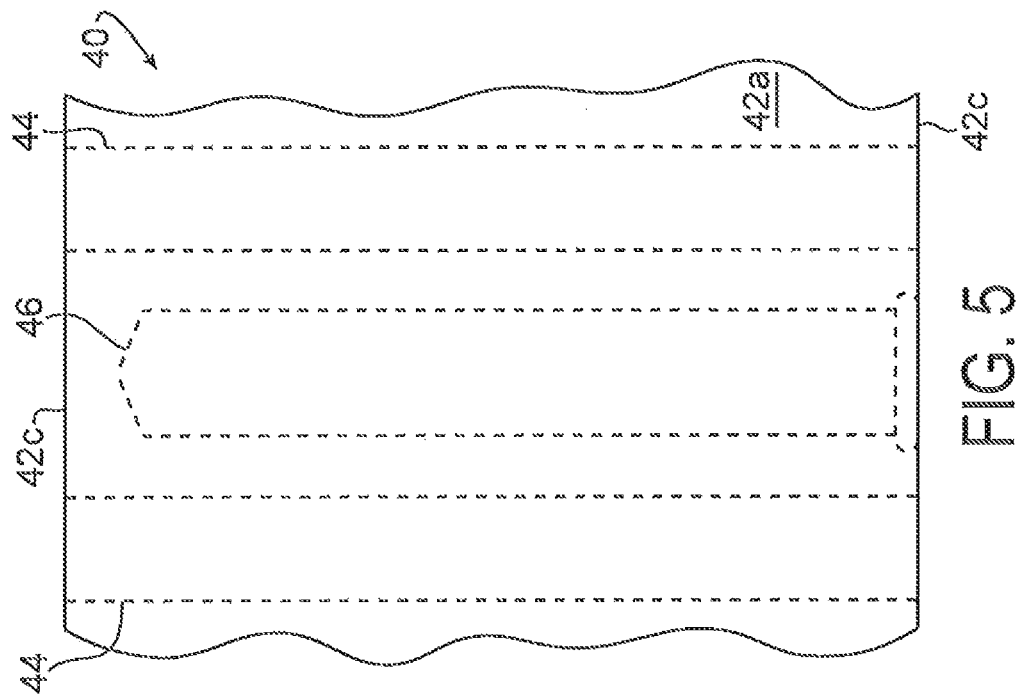

APPARATUS AND METHOD FOR CURING A RUBBER LIKE ARTICLE

BACKGROUND OF THE INVENTION

1. Field of the Invention

This invention relates generally to the formation of a moldable material, and, more specifically, to the molding and/or curing of an annular article.

2. Description of the Related Art

Tires traditionally include a tread and belt area extending between opposing sidewalls, which together with a tire wheel form an inflatable pressurization chamber to facilitate use of the tire. The sidewalls generally extend in a radial direction toward the central axis of the tire. To form the tire, a green tire is built at least partially from uncured materials. Subsequently, the green tire is placed within a tire mold for molding and curing. Such mold generally includes an outer mold portion that generally forms the exterior profile and surfaces of the tire. The outer mold portion may be formed of a plurality of members. Within the mold, a flexible bladder is generally used to force the green tire outwardly in a radial direction against the profile formed by the outer mold portion.

More recent tire developments include providing a non-inflating tire, the tire comprising a band of material that, in effect, forms a tread band without any sidewalls extending radially from such tread band. The use of traditional tire molding/curing methods to form this non-traditional tire has, however, provided less than optimum results. Accordingly, there is a need to provide new methods and apparatus for molding and/or curing a band or ring-like article.

SUMMARY OF THE INVENTION

Particular embodiments of the invention include methods and apparatus for molding and/or curing an article. In more specific embodiments, methods and apparatus for molding and/or curing an annular article are provided. Particular embodiments of the invention include a mold core for use in a mold to form an annular article, wherein the mold core is positioned within the mold to form an annular mold cavity between the mold core and an outer mold portion, the mold core including an outer ring having an outer surface for engaging the annular article, the outer ring being formed of a material capable of expanding and contracting with changes in temperature, the outer ring also having a width extending between opposing lateral side surfaces, and a thickness extending between an outer molding surface and an inner surface. The mold core may have a movable or slidable attachment to an exposed surface of the mold so that as the mold core cools, a substantially uniform gap between the article and the mold core is created allowing the article to be easily removed from the mold core. Particular embodiments of the mold core may also include an inner member positioned within a central portion of the outer ring, the inner member being positioned in spaced relation to the inner surface of the outer ring; and a plurality of translation members extending radially relative to the outer ring, and between the outer ring and the inner member, the translation members slidably engaging one of the outer ring and the inner member as the outer ring expands or contracts with changes in temperature.

Particular embodiments of the present invention also include an apparatus that has a mold for forming an annular article, the mold including a mold outer portion and a mold core positioned within mold outer portion. In particular embodiments, the mold core includes an outer ring having an outer surface for engaging the annular article, the outer ring being formed of a material capable of expanding and contracting with changes in temperature, the outer ring also having a width extending between opposing lateral side surfaces, and a thickness extending between an outer molding surface and an inner surface. This apparatus may also have a cooling station with an exposed surface that the mold core is attached to at least in a partially sliding manner so that as the mold core is cooled, the outer ring contracts concentrically away from the article, creating a uniform gap between the article and the perimeter of the outer ring. In further embodiments, the mold core may include an inner member positioned centrally within the outer ring, the inner member being positioned in spaced relation to the inner surface of the outer ring. In still further embodiments, the mold core includes a plurality of translation members extending radially relative to the outer ring, and between the outer ring and the inner member, the translation members slidably engaging one of the outer ring and the inner member as the outer ring expands or contracts with changes in temperature.

Particular embodiments of the present invention also include a method of molding and/or curing an annular article from a mold, the method including the step of positioning a mold core centrally within a mold outer portion to form an annular mold cavity between the mold outer portion and the mold core., the mold core including an outer ring having an outer surface for engaging the annular article, the outer ring being formed of a material capable of expanding and contracting with changes in temperature. In particular embodiments, such methods include the steps of heating the outer ring, and cooling the outer ring subsequent to the step of heating, whereby the outer ring contracts relative to the article. Further, such methods may include the step of removing the article from the core outer ring.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 3 is a partial cross-sectional side view of the core outer ring shown in FIG. 2, showing a heating cavity in accordance with an embodiment of the present invention.

FIG. 4 is a partial cross-sectional side view of the core outer ring shown in FIG. 2, showing a cooling cavity in accordance with an embodiment of the present invention.

FIG. 5 is a side view of a core outer ring showing a pair of heating cavities and a cooling cavity, in accordance with an embodiment of the present invention.

FIG. 6 is a side view of a core outer ring showing a pair of heating cavities and a cooling cavity, in accordance with an alternative embodiment of the present invention.

DETAILED DESCRIPTION OF PARTICULAR EMBODIMENTS

Particular embodiments of the present invention provide methods and apparatus for molding and/or curing an annular (ring-like or band-like) article, such as, for example, a tread band or a tire or tire-like band without sidewalls.

Molded tires traditionally include a pair of opposing sidewalls each extending radially inward from a tire tread area and to a tire bead. A mold for forming traditional or conventional tires generally includes an expandable membrane (i.e., bladder) positioned centrally within the mold, such that the unmolded tire is positioned between the membrane and an outer portion of the mold. During the molding process, the membrane expands to force the tire radially and/or axially outward against the outer mold portion to form the exterior surfaces of the tire, including tread and sidewall surfaces. Subsequently, the membrane reduces in size beyond the inner-most portion of the tire to facilitate tire removal. Certain non-conventional tires, however, may not include any molded sidewalls, and instead form an annular article, which extends laterally to form the tread area of the tire. The annular article may resemble a cylinder or ring, and include reinforcements, such as textiles and/or fabric, to increase its strength and/or durability. The annular article may be mounted to a drum or wheel, such as for use as a non-inflated tire. The present invention provides methods and apparatus for forming the annular tire article, as well as for forming a tread band for as retreaded tire, or any other moldable annular article for use in any industry.

Figure 1:
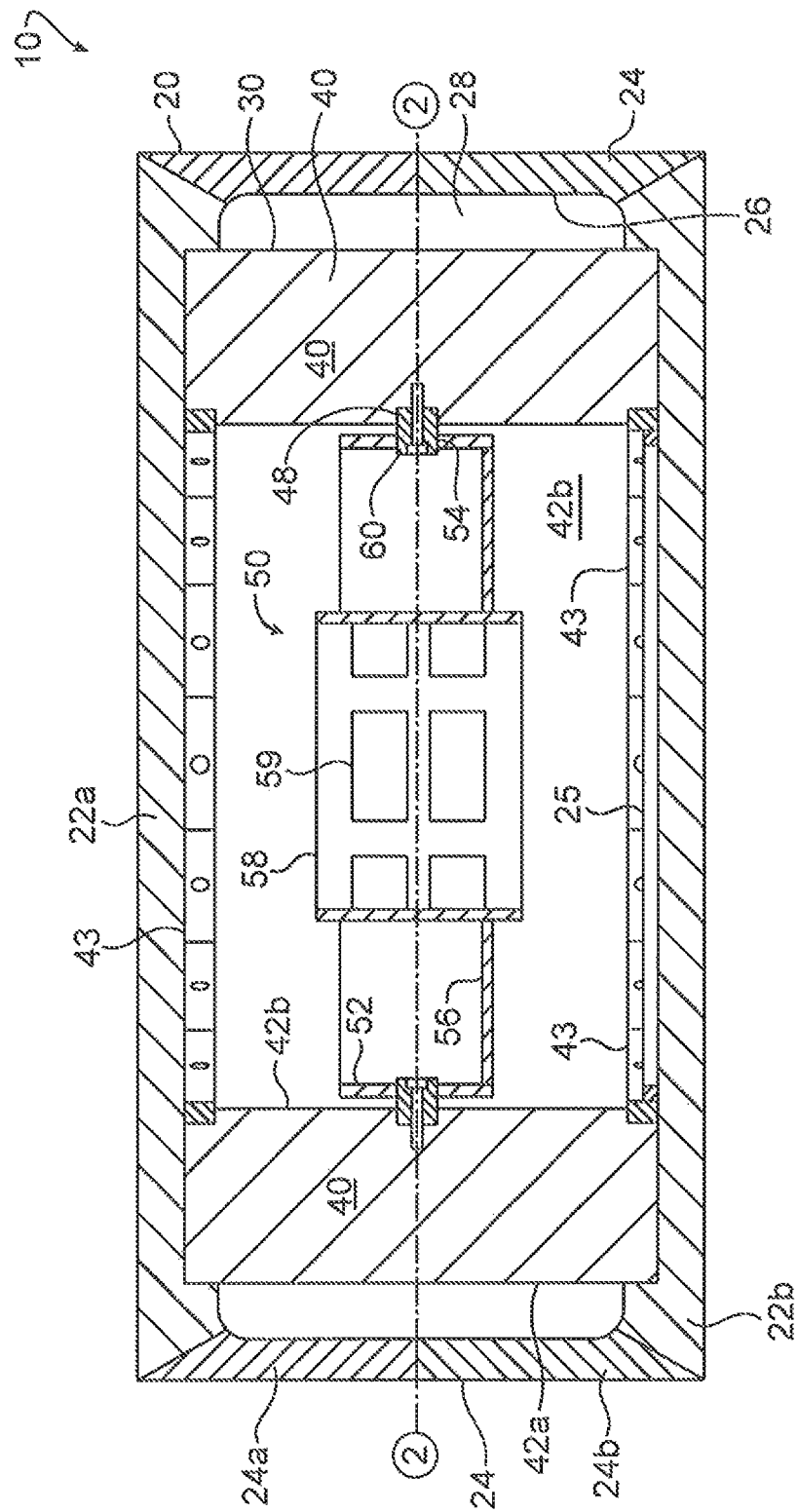
FIG. 1 is a cross-sectional side view of a mold for forming an annular or band-like article, the mold having a mold core centrally positioned within an outer mold portion, in accordance with an embodiment of the present invention.
Figure 2:
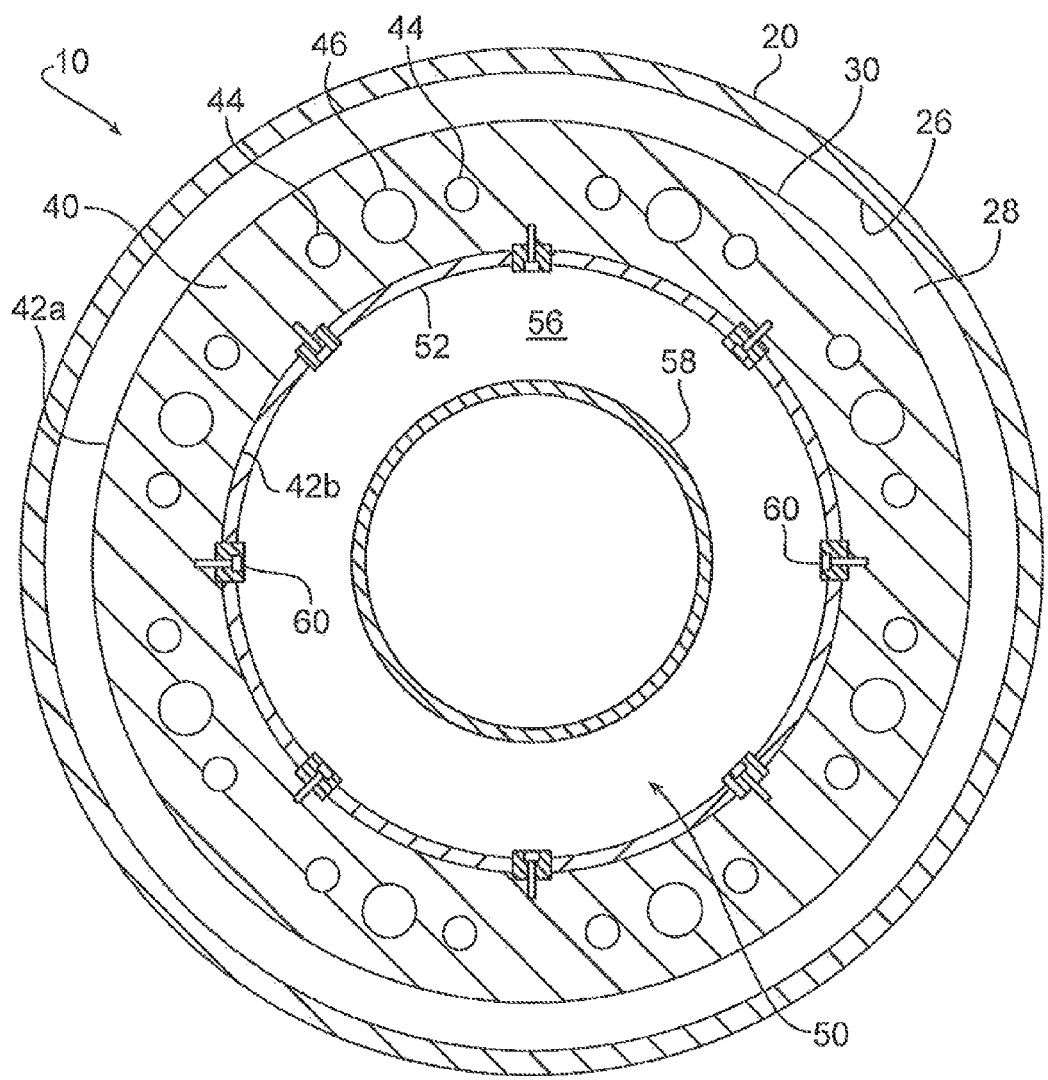
FIG. 2 is a top cross-sectional view of the mold shown in FIG. 1, taken along line 2-2.

With reference to FIGS. 1-2, a mold 10 for use in practicing the methods described herein, according to one embodiment, is generally shown. Mold 10 includes a mold core 30 positioned centrally within a mold 10. Mold core 30 is used in lieu of an expandable membrane within mold 10 to form an annular article 90 (shown in FIGS. 8-9) with outer mold portion 20. Outer mold portion 20 generally represents the outer extents of the mold, and provides surfaces against which moldable material is forced to form article 90. Accordingly, outer mold portion 20, in conjunction with mold core 30, forms an annular molding cavity 28 for use in forming annular article 90.

It follows that methods of molding an annular article may include the step of positioning a mold core centrally within an outer mold portion to form a mold cavity between the outer mold portion and the mold core. Perfuming the step of positioning includes transferring mold core 30 in and out of mold 10 in accordance with any known method, or obvious variation. For example, mold core 30 may be inserted and/or removed axially (i.e., in an axial direction of mold core 30). Further, with reference to FIGS. 1-2, mold core 30 may be positioned coaxially with outer mold portion 20. To position mold core 30 as desired, mold core 30 may engage an alignment member 25 contained within mold 10. Alignment member 25 may be continuous, or may comprise various segments. Alignment member 25 may be formed with, or affixed to, outer mold portion 20. Alternatively, alignment member 25 may exist independent of outer mold portion 20. Prior to inserting mold core 30 into outer mold portion 20, material for forming annular article 90 may be mounted upon mold core 30. For example, mold core 30 may operate as a building drum, upon which material is assembled to form pre-molded article 90. Alternatively, the material may be placed about a mold core 30 that has previously been positioned within mold 10, As mentioned above, outer mold portion 20 provides surfaces for forming article 90, and generally represents any configuration of components for engaging and forming article 90, such as those utilized by a conventional tire mold. For example, with continued reference to FIGS. 1-2, outer mold portion 20 may include top and bottom portions 22a, 22b, respectively, to facilitate the opening and closing of mold 10. Further, outer mold portion 20 may include a plurality of segments 24 extending about a circumference of mold 10, which may be partitioned into top and bottom segments 24a, 24b, respectively. As with conventional segmented tire molds, segments 24 translate radially outward to prevent the tearing of any features formed into article 90. If mold 10 does not include segments 24, top and/or bottom portions 22a, 22b may extend to enclose mold cavity 28. It is contemplated, that any outer mold portion 20 known to one of ordinary skill in the art, or any variation thereof, may be employed by mold 10, and contained within the scope of the present invention.

With continued reference to FIGS. 1-2, outer mold portion 20 may include a recess 26 for forming molding cavity 28 when bounded by mold core 30. Recess 26 may be formed by providing a radial space or gap between the outer surface 42a of mold core 30 and at least a portion of outer mold portion 20. Recess 26 may include any features, such as, for example, textures, projections, and recessions, for forming corresponding forms within article 90. For example, recess 26 may include features for forming a tread pattern and related forms within article 90.

With reference to the embodiment shown in FIGS. 1-2, mold core 30 includes an outer ring 40 and an inner member 50. Core outer ring 40 is designed to expand and contract radially relative to article 90, to facilitate the demolding of article 90 from mold core 30. Core outer ring 40 may also expands and contracts radially relative to mold outer member 20 and core inner member 50. To achieve expansion and contraction, core outer ring 40 is formed of a material that expands and contracts with changing temperature. In one embodiment, core outer ring 40 is formed of aluminum. Aluminum and aluminum alloys are characterized as having a coefficient of linear thermal expansion of generally within the range of 2.1-15 mm/mm/Celsius×$10^{-5}$ for a temperature range of 100-390 degrees Celsius. The coefficient of volumetric thermal expansion is a multiple of 3 times (300%) the value of the coefficient of linear thermal expansion. Accordingly, core outer ring 40 may be substantially or primarily formed of a material having a coefficient of linear thermal expansion equal to, or greater than, that of aluminum. In other embodiments, core outer ring 40 is formed of a material having a coefficient of linear thermal expansion approximately equal to, or greater than, approximately 1.5 mm/mm/Celsius×$10^{-5}$, or a coefficient of linear thermal expansion greater than steel, for a temperature range of 100-390 degrees Celsius. It is contemplated that core outer ring 40 may be formed of any material for achieving any desired expansion and contraction within any desired temperature range.

In particular embodiments, core outer ring 40 expands and contracts more than (has a coefficient of linear thermal expansion greater than) core inner member 50, within a particular temperature range. For example, at least a portion of core inner member 50 is formed of a material, such as steel, for example, having a coefficient of linear thermal expansion less than core outer ring 40. Steel has a coefficient of linear thermal expansion generally within the range of approximately 1.0-1.4 mm/m,/Celsius×10$^{-5}$ for a temperature range of 540-980 degrees Celsius. In other embodiments, the coefficient of linear thermal expansion of core outer ring 40 is approximately equal to, or greater than, 150% (a multiple of 1.5 times) the coefficient of linear thermal expansion of inner member 50, at similar temperatures. By forming core inner member 50 from one or more materials that expand and contract less with changing temperatures, inner member 50 is more dimensionally stable and is more optimally interoperable with any mechanism or device for handling, transporting, or receiving mold core 20. Accordingly, the step of positioning a mold core, in particular embodiments of the methods disclosed herein, includes as mold core having an outer ring formed of a material capable of expanding and contracting with changes in temperature. In further embodiments of such methods, the core outer ring is formed of a material having a coefficient of thermal expansion greater than that of a material forming at east a portion of the inner member.

With reference to FIGS. 1-4, outer core ring 40 generally includes outer surface 42a and inner surface 42b. Outer surface 42a operates as a mounting surface for article 90 (shown in FIGS. 8-9), and forms at least a portion of mold cavity 28. Outer surface 42a may also engage outer mold portion 20, such as for substantially sealing molding cavity 28 to reduce the loss of moldable material during a molding process. With specific reference to FIG. 3, core outer ring 40 may comprise a generally rectangular or square cross-sectional shape having a thickness t and a height h. Outer and inner surfaces 42a, 42b are generally cylindrical and smooth, but may instead form other shapes and/or include any contours, textures, or other features as desired, such as for the purpose of creating increased surface area or other features along the inner surface 92 of article 90 (generally shown in FIGS. 8-9). Accordingly, the step of positioning a mold within outer mold portion, in particular embodiments of the methods disclosed herein, includes a mold core having an outer ring, the outer ring having an outer surface for engaging the annular article.

With continued reference to FIGS, 1-4, contact surfaces 43 may be positioned around the top and bottom edges of inner surface 42b at particular locations for contacting or interfacing portions of outer mold member 20 or other mounting surfaces within mold 10, such as any alignment member 25. Surfaces 43 may provide a durable surface for contacting and/or interacting with other members or surfaces. In the embodiment shown, contact surfaces 43 comprise arcuate plates attached to inner surface 42b in a ring like arrangement. In the alternative, contact surfaces 43 may be arranged intermittently about outer surface 42b. It is also contemplated that contact surfaces 43 may comprise a plating or coating formed along outer surface 42b, in lieu of plates or other forms. Contact surfaces 43 may be formed of steel, or any other desired material suitable for its desired purpose.

As mentioned above, a core inner member 50 may be placed within core outer ring 40. With reference to FIGS. 1-2, a plurality of translation members 60 may extend between core outer ring 40 and core inner member 50 to allow core outer ring 40 to expand and contract as desired. Accordingly, the step of positioning a mold core centrally within an outer mold portion, in particular embodiments of the methods disclosed herein, includes a mold core having an inner member positioned centrally within the outer ring in spaced relation to the inner surface of the outer ring, and a plurality of translation members extending radially relative to the outer ring, and between the outer ring and the inner member, the translation members slidably engaging one of the outer ring and the inner member as the outer ring expands or contracts with changes in temperature.

Figure 8:
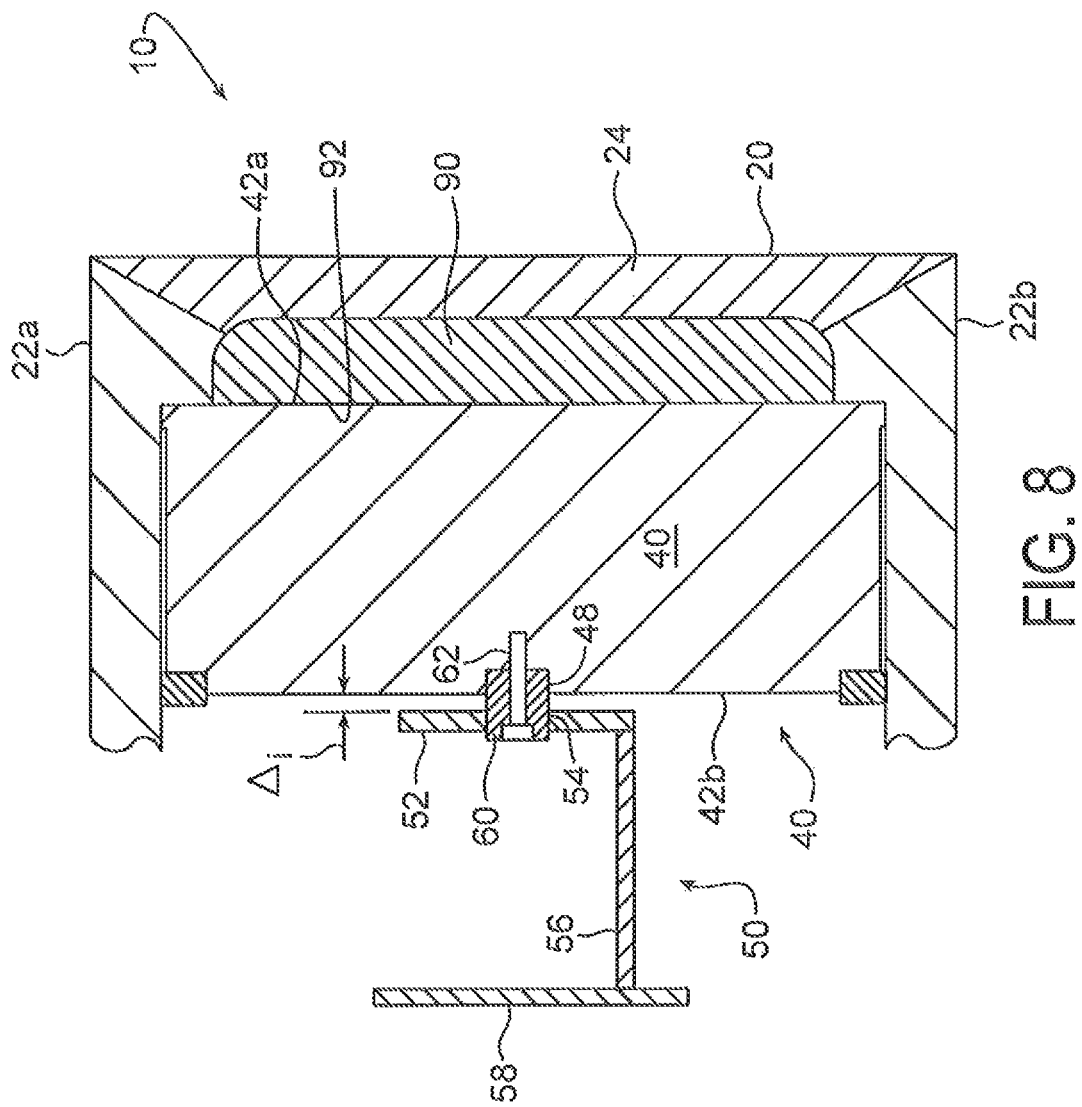
FIG. 8 is a cross-sectional side view of the mold of FIG. 1, showing the core outer ring engaging a mold outer member while the ring is in a heat-expanded state, in accordance with an embodiment of the present invention.
Figure 9:
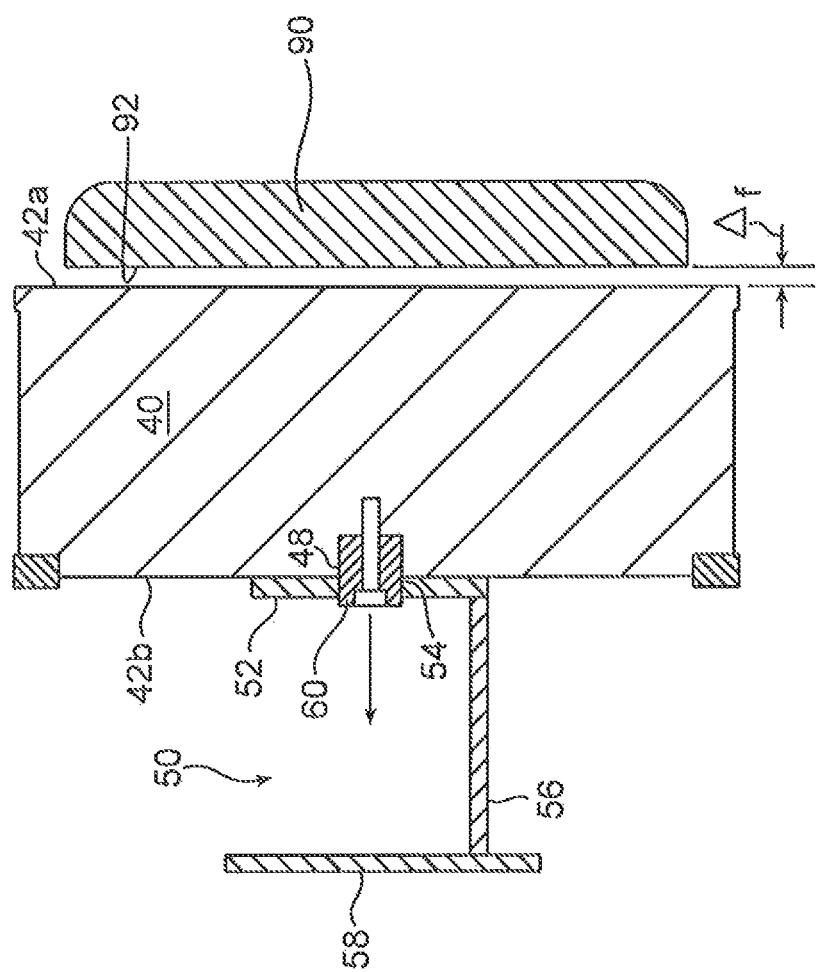
FIG. 9 is a cross-sectional side view of the mold of FIG. 1, showing the core disengaged from a band-like article subsequent to cooling the core outer ring after removal from the mold, in accordance with an embodiment of the present invention.

Translation members 60 may comprise pins, as shown generally in FIGS. 1-2, and more specifically in FIG. 8-9, or any other known device or means, such as bearings or the like, capable of facilitating the relative translation between outer ring 40 and inner member 50. With general reference to the FIGURES, translation members 60 may be attached to core outer ring 40, and extend through apertures 54 formed within core inner member 50, wherein translation members 69 are in sliding engagement with apertures 54 and core inner member 50. In particular embodiments, translation members 60 may also extend into an aperture 48 formed within core outer ring 40 to provide improved lateral support for translation members 60. Alternatively, translation members 60 may be attached to core inner member 50 while slidingly engaging an aperture formed within core outer ring 40. Translation members 60 may be attached by any known means, such as, for example, by welding, press-fitting, or mechanical interference, or by use of adhesives or fasteners 62, which are exemplarily shown in FIGS. 1-2, 8-9.

Translation members 60, such as pins, may be formed of any material, or coated with any desired material, to facilitate a more optimum sliding operation. For example, pins may be formed of, or coated with, bronze, or any other material that may operate as a bearing material. Translation members 60 may also be coated with to lubricant, which may be a high temperature lubricant Any quantity of translation members 60 may be spaced about mold core 30. When utilizing pins, each pin may be sized to provide adequate strength and exterior surface area to achieve its intended purpose. For example, mold 10 may include five (5) bronze pins, each of which may have an outside diameter of at least approximately 30-35 mm.

As shown generally in FIGS. 1-2 and 8-9, core inner member 50 generally includes an outer portion 52, web 56, and inner portion 58. Core inner member 50 generally provides a means for handling, transporting, securing, and/or mounting mold core 30, while allowing core outer ring 40 to expand and contract as desired. Within core outer ring 40, core outer portion 52 is positioned in spaced relation to inner surface 42b to facilitate the expansion and contraction of outer ring 49. In the embodiment shown, outer portion 52 includes a plurality of apertures 54 for slidingly accepting translation members 60. Outer portion 52 may form a ring as shown, or, alternatively, may form any other shape or extend intermittently around inner surface 42b of core outer ring 40.

With continued reference to FIGS. 1-2 and 8-9, web 56 extends radially to connect core outer portion 52 and inner portion 58. Web 56 may form a continuous structure, or, alternatively, may include a plurality of voids or discontinuities. For example, web 56 may comprise a plurality of spokes or spoke-like members that extend between outer portion 52 and inner portion 58.

In the embodiment shown in FIGS. 1-2 and 8-9, inner portion 58 at least partially extends axially (i.e., in an axial direction of core 30) to strengthen inner core 40 and/or to provide a surface to facilitate mounting and/or attachment of core 30 to any device or machine. Inner portion 58 may form a cylinder as shown in FIGS, 1-2, having any desired cross-sectional shape, such as, for example, a square, or may extend intermittently around the axis of core 30. Accordingly, inner portion 58, as well as outer portion 52 and web 56, may each be formed from a single member or of multiple members. It is contemplated that web 56 may exist without inner portion 58.

Inner core 50 may be adapted to facilitate any desired handling, transport, or securement of mold core 30. For example, mold core 30 may be transported to and from mold 10, inserted and secured into mold 10, and extracted from mold 10. Mold core 30, as mentioned above, may also me mounted and secured to a tire building machine, Accordingly, inner core 50, and any of its components, may be sized, shaped, or include features 59 (shown by example in FIG. 1) to facilitate handling, transfer, and/or securement of mold core 34) and its interoperability with any related any device or machine.

Inner core 50, or any combination of its components, may be formed independently or as a single monolithic form. When assembling inner core 50 from multiple components, the components may be secured by any known means, such as, for example, welding or use of fasteners. In particular embodiments, it is contemplated that mold core 30 may not include an inner member 50, and, instead, outer ring 40 may include any desired features that would otherwise be included within inner member 50, such as, for example, any features 59 for handling, transferring, or securing mold core 30.

Alternatively, the mold core 39 may comprise a unitary body have an outer ring portion that is connected to an inner hub by a web. The inner hub may be hollowed out and the web and outer ring kept to a minimum thickness in order to reduce the amount of material that composes the mold core so that it will heat up and cool down more quickly. The bottom surface of the mold core could be attached to an exposed surface by at least two key and keyway combinations with either the key or keyway being found on either surface. The keys and keyways would be configured so that they would slide relatively to each other, keeping the mold core center fixed in position while it expands or contracts concentrically. The keys and keyways could be spaced apart from each other at ninety degree internals. Preferably, there would be four such combinations at ninety degree intervals.

With general reference to the embodiment shown in FIGS. 2 and 3, core outer ring 40 includes a plurality of heating cavities 44. Heating cavities 44 are provided for the purpose of heating outer ring 40 during molding and/or curing operations within mold 10. Heating cavities 44 may be distributed approximately evenly about a circumference of outer ring 40 to more evenly and uniformly heat ring 40. One or more heating sources 45 operate conjunctively with heating cavities 44 to heat outer ring 40. For example, with reference to FIGS. 2 and 3, an electric heating cartridge or element positioned within each cavity 44. Alternatively, heated fluid, such as, water, steam, or any other liquid or gas, may flow through cavities 44 as desired. Still, any other known means of heating may be used to heat outer ring 40, with or without cavities 44. For example, a heating source may heat outer ring 40 indirectly (i.e., through another mold component), or directly through a surface of outer ring 40. Accordingly, in the methods disclosed herein, particular embodiments of the step of heating includes heating the core outer ring by use Of one or more heating sources positioned in operable communication with one or more heating cavities formed within the outer ring 40. In further embodiments of such methods, the one or more heating cavities are approximately uniformly spaced around the outer ring. In still further embodiments of such methods, the one or more heating cavities extend in an axial direction of the outer ring. Alternatively, a cartridge heater may be found in one or more heating cavities which receives electricity from the mold to heat the outer ring 40.

As shown in FIG. 3, heating cavity 44 may extend fully through the width of outer ring 40, or, alternatively, partially through a width of Miter ring 40. Heating cavity 44 may extend linearly, as generally shown in FIG. 3, or non-linearly, as generally shown in FIG. 6. For example, a non-linear heating cavity 44 may extend helically about outer ring 40. As shown in the FIGURES, heating cavity 44 may have a constant outer diameter $d_{44}$, or may taper or vary along its length as desired. Heating cavity 44 may be sized to maximize surface contact with the heating source. A depression 47 may be included along a side surface $42c$ for the purpose of routing any wiring or tubing extending from the heating source or any cooling, source associated with cool cavities 46 (discussed below).

With general reference to FIGS. 2 and 4, core outer ring 40 includes a plurality of cooling cavities 46. Accordingly, in particular embodiments of the methods disclosed herein, the step of positioning includes a mold core having one or more cooling cavities positioned around the outer ring. Cooling cavities 46 are provided as a means of cooling outer ring 40 to facilitate the removal of article 90 from ring 40 subsequent a molding and/or curing process. As with heating cavities 44, cooling cavities 46 may be distributed approximately evenly about a circumference of outer ring 40, and may extend linearly or non-linearly, and partially or fully, through outer ring 40. Likewise, cooling cavity 46 may have a constant or variable outer diameter $d_{46}$. In a particular embodiment, outer ring 40 includes 10 evenly spaced cooling cavities 46, each having a diameter $d_m$ of approximately 1 inch. It is contemplated, that heating cavities 44 and/or cooling cavities 46 may operate as both heating and cooling cavities (i.e., dual-purpose cavities). Accordingly, core outer ring 40 may only include dual-purpose cavities, or may include both dual-purpose cavities and single-purpose cavities (i.e., heating cavities 44 and/or cooling cavities 46). As with heating cavities 44, is it contemplated that cooling may be achieved without use of a cooling cavity 46, as such cooling may be achieved by applying a cooling source 70 to any exterior surface of outer ring 40. Alternatively, a cooling source such as a heat sink may be used that is in contact with the core outer ring to cool it by conduction, thus eliminating the need for cooling cavities altogether.

Figure 7:
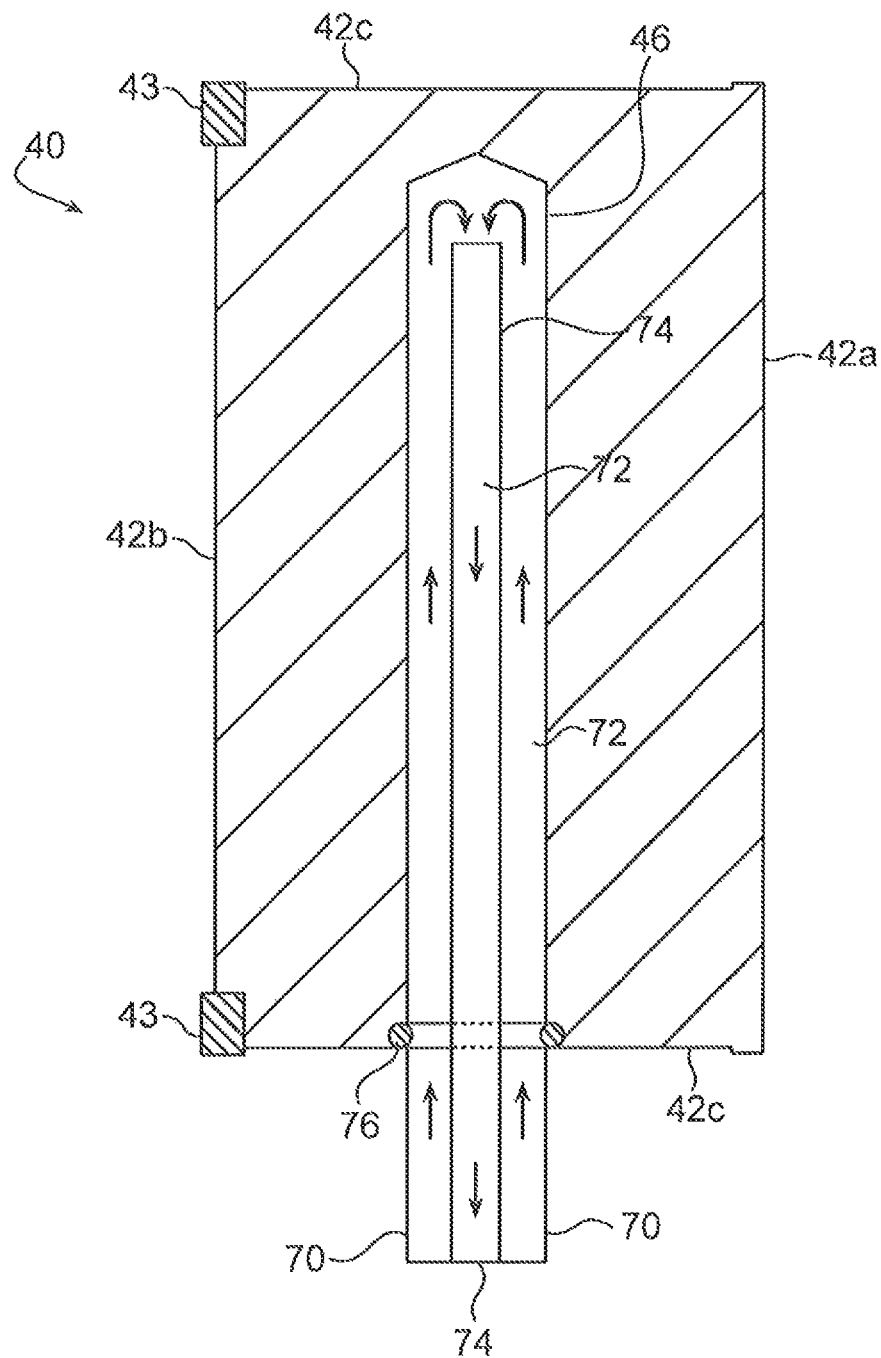
FIG. 7 shows a mold core cooling operation in association with the core cross-section of FIG. 4, in accordance with a particular embodiment of the present invention.

With reference to FIG. 7, a cooling source 70, may be placed in communication with a cooling cavity 46. Cooling source 70 may utilize any known cooling means, such as a heat sink or cooling fluid 72, to facilitate cooling of outer ring 40. Accordingly, the step of cooling, in particular embodiments of the methods disclosed herein, include flowing cooling fluid through the cooling cavities. Cooling fluid 72 may comprise water or any other liquid or gas, which may be supplied at any pressure, temperature (such as ambient or room-temperature), or flow rate to control the cooling of outer ring 40 as desired. For example, cooling fluid 72 may be supplied to core outer ring 40 at ambient or room temperature, at 5-10 gallons per minute, and at a pressure of 100 psi. By altering the size, shape, and/or material of outer ring 40, the cooling rate of outer ring 40 may further be controlled, With specific regard to the cooling operation shown in FIG. 7, cooling Source 70 injects cooling fluid 72 into cooling cavity 46 at a first end of cavity 46, while fluid recovery 74 is inserted into cooling cavity 46 to reclaim the cooling fluid 72 at a second end of cavity 46. It is contemplated that the flow shown in FIG. 7 may be reversed, whereby the source 70 is inserted into cooling cavity 66 to inject cooling fluid 72 into the second (closed) end of cavity 46, and recovered at the first (open) end of cavity 46 by fluid recovery 74. When cooling cavity 46 extends fully through a width of core outer ring 40, cooling fluid 72 may flow between fluid source 70 and fluid outlet 74, each of which are positioned at opposite ends of cooling cavity 46. A sealing member 76 may be provided to prevent any leakage of cooling fluid 72 from cavity 46. Sealing member 76 may comprise an o-ring or a gasket, or any other known sealing device. Accordingly, the step of cooling, in particular embodiments of the methods disclosed herein, includes placing a cooling fluid source in operable communication with one or more of the cooling cavities, and placing a cooling fluid recovery outlet in operable communication with one or more of the cooling cavities.

As a result of the cooling operation, core outer ring 40 is cooled to any desired temperature to sufficiently contract and shrink for removal of article 90 from outer ring 40. In one example, outer ring 40 is cooled to approximately 80 degrees Celsius prior to removing article 90. With reference to FIG. 8, a heated core 30 is shown positioned within mold 10. When ring 40 is heated, it expands to an expanded state, whereby inner surface 42b of outer ring 40 is separated from core inner member 50 by any desired distance $\Delta_I$, which may be in the range of 0.8 to 2.5 mm for example. Such expansion may force outer surface 42a of outer ring 40 against a portion of outer mold portion 20 to substantially close or seal mold cavity 28. With reference to FIG. 9, core 30 is shown after removing article 90 subsequent to performing a cooling operation on core outer ring 40. When cooling outer ring 40, ring 40 contracts to provide a separation distance $\Delta_f$ between ring outer surface 42a and article 90 for removal of article 90 from core 30. Separation distance $\Delta_f$ may be as small as 1-3 millimeters (mm). Accordingly, particular embodiments of the methods disclosed herein include the steps of heating the outer ring, cooling the outer ring subsequent to the step of heating, whereby the outer ring contracts relative to the article, and removing the article from the core outer ring. Particular embodiments of the methods disclosed herein may also include a step of removing the core from the mold after the step of heating, and before the step of cooling.

Removal of article 90 from core 30 may be achieved by translating or lifting either article 90 or core 30 from the other. Because the separation distance $\Delta_I$ between core 30 and article 90 may be relatively small, such as 1-3 mm, core 30 or article 90 may be lifted concentrically from the other to avoid substantial contact with the other. Because at least portions of article 90 may remain partially attached (i.e., adhered) to core outer surface 42a after sufficiently cooling core 30, removal may be facilitated by forming at least the inner surface 92 of article 90 from a material characterized as having a low surface friction (i.e., low tack). For example, article inner surface 92 is formed of a polymeric/elastomeric material, that when cured, provides low surface friction. Further, core outer surface 42a may be prepared or finished to provide a low-friction surface to facilitate removal of article 90 from core 30.

In operation, according to a particular embodiment, core 30 with uncured article 90 is inserted into an open mold 10 prior to a molding and/or curing process. In an open position, components of mold outer portion 20 are separated to allow core 30 to be inserted into a central portion of mold 10. Upon closure of mold 10, the components of mold outer portion 20 are collapsed to form a molding cavity 28 between mold outer portion 20 and core 30. Subsequently, mold 10 is heated according to methods known in the art, for the purpose of heating article 90 for a molding and/or curing process. Core 30 may be pre-heated prior to being positioned within mold 10. One or more heating sources 45 may be used to heat core outer ring 40 through beating cavities 44 or by conduction as previously described. Subsequent a molding and/or curing operation, mold 10 is opened, and core 30 removed with article 90 mounted to outer surface 42a. Core 30 is then subjected to a cooling operation remotely from the mold to facilitate the removal of article 90 from core 30, such as, for example, at a cooling station or apparatus. While this process is being performed, a subsequent core 30 and article 90 may be placed within mold 10 for a new molding and/or curing operation. Alternatively, cooling of core 30 may occur before removing core 30 from mold 10, and article 90 may be removed from core 30 while core 30 remains in mold 10.

As previously stated, prior to the insertion of core 30 within mold 10, an article 90 is first built upon core 30. For example, core 30 may operate as a building drum for forming a tire article 90 thereupon. Accordingly, article 90 is mounted upon core 30, and more specifically, along outer surface 42a of core outer ring 40 before the core 30 is inserted into mold 10. It follows that, in other embodiments, article 90 may be placed within mold 10 separately from core 30, where core 30 expands to contact article 90 after being heated during a molding and/or curing operation within mold 10. Likewise, the core 30 may be preheated so that the article has an elevated temperature before entering the mold to reduce the cure time necessary in the mold.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. An apparatus for forming an annular article comprising a mold and a mold core wherein the mold core is positioned within the mold to form an annular mold cavity between the mold core and an outer mold portion, the core comprising:
   an outer ring having an outer surface for engaging the annular article, the outer ring being formed of a material capable of expanding and contracting with changes in temperature, the outer ring also having a width extending between opposing lateral side surfaces, and a thickness extending between an outer molding surface and an inner surface, said outer ring being attached to an exposed surface of the mold in a movable manner so that as the outer ring contracts the outer ring remains concentric with the annular article creating a substantially uniform gap between the outer ring and the annular article;
   an inner member positioned within a central portion of the outer ring, the inner member being positioned in spaced relation to the inner surface of the outer ring; and
   a plurality of translation members extending radially relative to the outer ring, and between the outer ring and the inner member, the translation members slidably engaging one of the outer ring and the inner member as the outer ring expands or contracts with changes in temperature.

2. The apparatus of claim 1, wherein the outer ring is formed of a material having a coefficient of thermal expansion that is greater than a material forming at least a portion of the inner member.

3. The apparatus of claim 1, wherein the mold further comprises a heat source that transfers heat to the outer ring.

4. The apparatus of claim 3, wherein the mold core comprises a heating cavity that is in communication with the heat source of the mold.

5. The apparatus of claim 4, wherein a cartridge heater is placed within the heating cavity that receives electricity to heat the outer ring.

6. The apparatus of claim 1 or 3, which further comprises a cooling source that transfers heat away from the outer ring.

7. The apparatus of claim 6, wherein the outer ring further comprises a cooling cavity that is in communication with the cooling source.

8. The apparatus of claim 7, wherein a fluid flows into and out of the cooling cavity.

9. The apparatus of claim 1, wherein the translation members are attached to the outer ring, and slidably engaged with the inner member.

10. The apparatus of claim 1, wherein the inner member includes a ring positioned adjacent to the inner surface of the outer ring.

11. The apparatus of any claim 1-2, wherein the outer ring is formed of aluminum.

12. The apparatus of any claim 1-2, wherein the outer ring is formed of aluminum and at least a portion of inner member is formed of steel.

13. The apparatus of claim 1 wherein the translation members are formed at least in part of bronze.

14. The mold core of claim 1, wherein the mold core is also a building drum upon which material for assembling the annular article is placed.

15. An apparatus for forming an annular article, the apparatus comprising:
   an outer mold portion;
   a mold core positioned centrally within mold outer portion, the mold core including:
      an outer ring having an outer surface for engaging the annular article, the outer ring being formed of a material capable of expanding and contracting with changes in temperature, the outer ring also having a width extending between opposing lateral side surfaces, and a thickness extending between an outer molding surface and an inner surface; and
      a cooling station that has an exposed surface upon which the mold core is placed in at least a partially sliding manner so that as the outer ring contracts the outer ring remains concentric with the annular article creating a substantially uniform gap between the outer ring and the annular article:
      an inner member positioned centrally within the outer ring, the inner member being positioned in spaced relation to the inner surface of the outer ring; and,
      a plurality of translation members extending radially relative to the outer ring, and between the outer ring and the inner member, the translation members slidably engaging one of the outer ring and the inner member as the outer ring expands or contracts with changes in temperature.

16. The apparatus of claim 15, wherein the outer ring is formed of a material having a coefficient of thermal expansion that is greater than a material forming at least a portion of the inner member.

17. The apparatus of claim 15, wherein the mold further comprises a heat source that transfers heat to the outer ring.

18. The apparatus of claim 17, wherein the mold core comprises a heating cavity that is in communication with the heat source of the mold.

19. The apparatus of claim 18, wherein a cartridge heater is placed within the heating cavity that receives electricity to heat the outer ring.

20. The apparatus of claim 15 or 17, wherein the cooling station comprises a cooling source that transfers heat away from the outer ring.

21. The apparatus of claim 20, wherein the outer ring further comprises a cooling cavity that is in communication with the cooling source.

22. The apparatus of claim 21, wherein a fluid flows into and out of the cooling cavity.

23. The apparatus of claim 15, wherein the translation members are attached to the outer ring, and slidably engage with the inner member.

24. The apparatus of claim 15, wherein the inner member includes a ring positioned adjacent to the inner surface of the outer ring.

25. The apparatus of claim 15 or 16, wherein the outer ring is formed of aluminum.

26. The apparatus of claim 15 or 16, wherein the outer ring is formed of aluminum and at least a portion of inner member is formed of steel.

27. The apparatus of claim 15 wherein the translation members are formed at least in part of bronze.

28. The apparatus of claim 15, wherein the mold core is also a building drum upon which material for assembling the annular article.

29. A method of molding and/or curing an annular article from a mold, the method comprising the steps of:
   positioning a mold core centrally within a mold outer portion to form an annular mold cavity between the mold outer portion and the mold core, the mold core including an outer ring having an outer surface for engaging the annular article, the outer ring being formed of a material capable of expanding and contracting with changes in temperature; an inner member positioned centrally within the outer ring, the inner member being positioned in spaced relation to the inner surface of the outer ring; and, a plurality of translation members extending radially relative to the outer ring, and between the outer ring and the inner member, the translation members slidably engaging one of the outer ring and the inner member as the outer ring expands or contracts with changes in temperature;
   heating the outer ring;
   placing the mold core on an exposed surface in sliding relation thereto before cooling so that as the outer ring contracts, a substantially uniform gap is created between the mold core and article;
   cooling the outer ring subsequent to the step of heating, whereby the outer ring contracts relative to the article; and,
   removing the article from the core outer ring.

30. The method of claim 29 further comprising the step of preheating the mold core before putting it into the mold to reduce the cure time in the mold.

31. The method of claim 29 wherein said mold core is a drum for creating a tire.

32. The method of claim 29 further comprising the step of removing the core from the mold after the step of heating, and before the step of cooling.

* * * * *